United States Patent Office 2,956,521
Patented Oct. 18, 1960

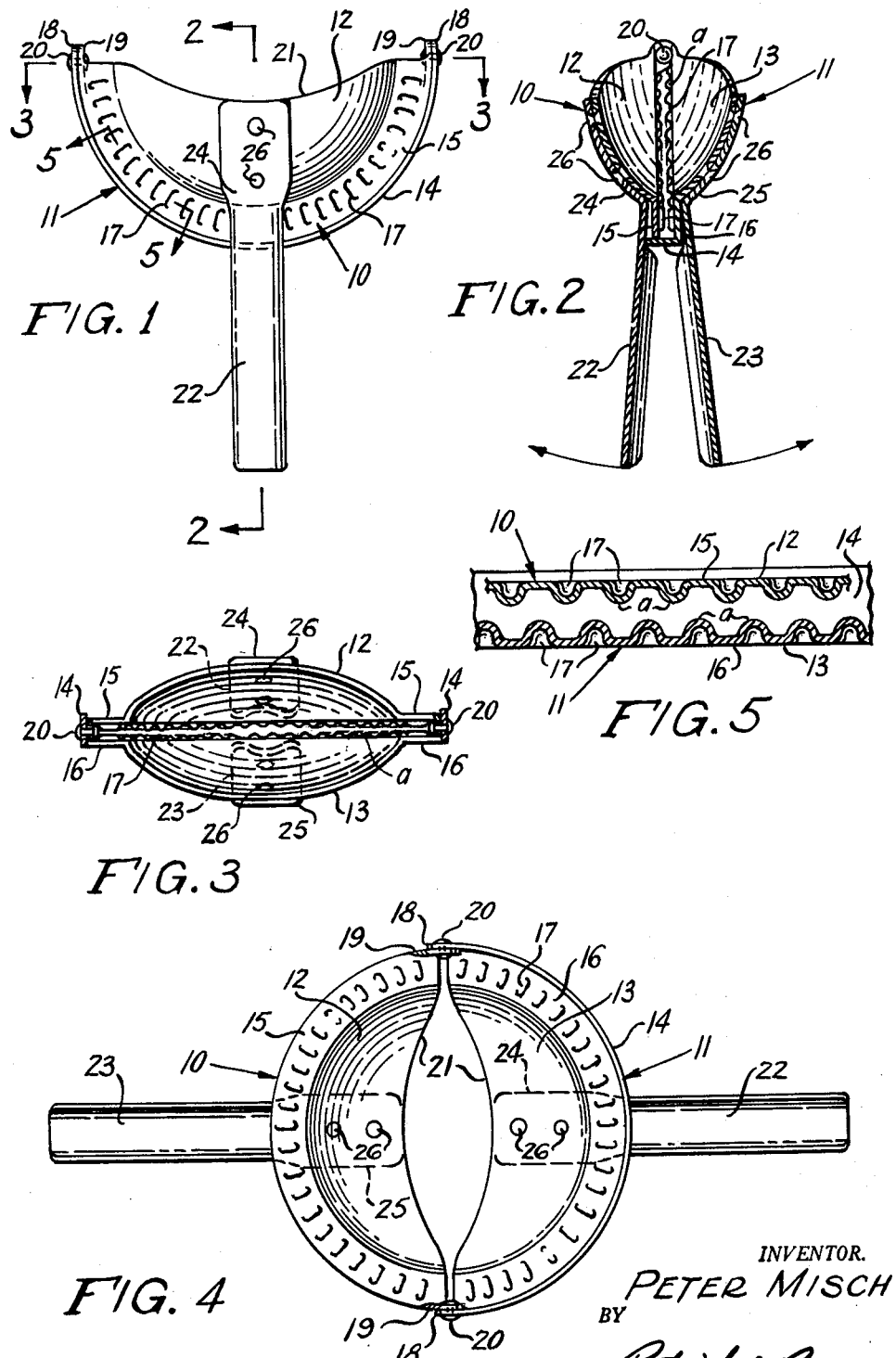

2,956,521

PIROGI MAKER

Peter Misch, 417 Spratt Place, Utica, N.Y.

Filed Aug. 29, 1958, Ser. No. 758,098

2 Claims. (Cl. 107—19)

This invention relates to molds whereby foodstuffs are formed preparatory to cooking, and more particularly to a mold for preparing pirogi, which is a delectable and succulent Polish dumpling, usually composed of a dough having flour, salt and eggs as its principal ingredients, this to produce a hollow covering for a filling such as sauerkraut, mixed with cottage cheese; potatoes with cottage cheese; cottage cheese alone, prunes, cabbage and various other edibles.

The principal object of this invention is to provide a pirogi maker or mold, which saves considerable time and labor in preparing the dumpling for cooking and another object here is to provide a mold for preparing pirogi in a uniform size.

A third object of the invention is to provide a pirogi which will not separate or come apart while cooking.

Still another object of the invention is to provide a pirogi maker which is of very simple construction and easy to manipulate.

A further object of the invention is to provide a pirogi mold or maker, which will retail on the market at a very low retail price and within the reach of all fanciers of this fine Polish edible.

These and various other objects and advantages of the invention will become apparent to the reader of the following description.

In the drawing:

Figure 1 is a top plan view of the mold in closed position.

Figure 2 is a section taken on line 2—2 of Figure 1.

Figure 3 is a cross-section taken substantially on line 3—3 of Figure 1.

Figure 4 is a top plan view of the pirogi mold in opened position.

Figure 5 is an enlarged detailed sectional view taken on line 5—5 of Figure 1.

Referring to the drawing wherein like numerals designate like parts, it can be seen that the pirogi mold is constructed of two sections generally referred to by numerals 10 and 11. These sections are of concavo-convex shape and are constucted of some suitable sheet metal, or sheet material that will serve the same purpose.

These sections are composed of thus formed shells 12, 13 of semi-circular extent, the shell 13 being provided with a cutting flange 14 at its perimeter.

The shells 12, 13, which are of concavo-convex shape are provided with outstanding crimping flanges 15, 16 respectively, each of which is formed to provide grooves or like meshing structures, one complement with the other, or stamped to provide undulations 17, as shown in Figure 5.

The lands *a* of the undulations 17 of the flanges 15, 16 mesh as shown in Figure 5 in order to get the necessary crimping action against the dough that is interposed during the forming of the pirogi dumpling.

It can here be seen, that the ends of the cutting flange 14 on the shell is provided with ears 18 and the ends of the flange 15 are provided with corresponding outstanding ears 19. These ears are formed with openings to accommodate rivets or the like 20 which are pivotally connected. It will be observed, that the free edges of the bottoms of the shells 12, 13 are curved inwardly as at 21, so that when the shells are moved to molding position, there will be a freer action of the mold sections with respect to the dough and the filler therein.

In order to properly release and contract the sections 10, 11 a pair of handles 22, 23 are employed and provided with arcuate attaching extensions 24, 25 for the shells 12, 13. These extensions 24, 25 maybe be riveted or otherwise secured to the shells as at 26. The handles 22, 23 are preferably of sheet metal and are of arcuate shape in cross-section for the purpose of reinforcement.

In the use and operation of this pirogi maker or mold, it can be seen that the dough is first prepared and rolled into a substantially thin sheet. The dough is then cut so that it will substantially cover the mold (excepting the handles) when the mold is in the position shown in Figure 4.

The filling is then placed upon the dough. This filling may be of any edible, such as those stated in the first part of this specification.

After the dough has been properly placed so that it will overlap the flanges 15, 16 and the filling has been imposed thereon, causing the dough to dip into the mold, the handles 22, 23 are brought together. This brings the undulated flanges 15, 16 toward each other and as the dough is crimped to adhere the dough, to form an enclosure, making up the integral dumpling, the cutting flange 14 severs the dough so that all surplus dough is removed, thus leaving a neat dumpling of uniform size.

According to the standard method of preparing these dumplings to be served, after the sections of the mold have been opened and the dumpling removed, is to drop them into salted boiling water, cook for about fifteen to twenty minutes. The dumplings thus cooked are drained and served with such edibles as fried onions, melted butter, sour cream, etc.

While the foregoing description sets forth the invention in specific terms, it is to be understood, that numerous changes in the shape, size and materials may be resorted to without departing from the spirit and scope of the invention as claimed hereinafter.

Having described the invention what is claimed as new is:

1. A mold for forming edibles such as pirogi dumplings comprising a pair of concave shells, each having a perimeter consisting of two portions, one, the inner edge, being formed with an arcuate cut-out portion and the other, the outer edge, being substantially semi-circular and outwardly bowed, means pivoting the ends of said inner edges of said shells together with the arcuate cut-out portions in confronting relation, crimping teeth formed on the outer semi-circular edges of each shell adapted to mest to crimp the edges of the dough against loss of filling, and a handle secured to the outer convex surface of each shell.

2. A mold for forming edibles such as pirogi dumplings comprising a pair of concave shells, each having a perimeter consisting of two portions, one, the inner edge, being formed with an arcuate cut-out portion and the other, the outer edge, being substantially semi-circular and outwardly bowed, means pivoting the ends of said inner edges of said shells together with the arcuate cut-out portions in confronting relation, crimping teeth formed on the outer semi-circular edges of each shell adapted to mesh to crimp the edges of the dough against loss of filling, and a handle secured to the outer convex surface of each shell, one of said shells being formed with a cutting flange on its outer semi-circular edge, said flange being adapted snugly to engage the edge portion of the other shell to sever any surplus dough when the shells are brought together in dough compressing position.

References Cited in the file of this patent

UNITED STATES PATENTS

| | | |
|---|---|---|
| D. 100,705 | Little | Aug. 4, 1936 |
| 1,596,652 | Giovanetti | Aug. 17, 1926 |
| 2,373,182 | Gamache | Apr. 10, 1945 |
| 2,588,454 | Abel et al. | Mar. 11, 1952 |
| 2,855,867 | Zeitlin | Oct. 14, 1958 |